Sept. 2, 1941. C. H. TAYLOR Re. 21,897

PROCESS OF HEAT TREATING AND TORCH THEREFOR

Original Filed March 13, 1933

INVENTOR
C. H. Taylor
BY
Frease and Bishop
ATTORNEYS

Reissued Sept. 2, 1941

Re. 21,897

UNITED STATES PATENT OFFICE 21,897

PROCESS OF HEAT TREATING AND TORCH THEREFOR

Charles H. Taylor, Springfield, Mass., assignor to The Linde Air Products Company, New York, N. Y., a corporation of Ohio Original No. 2,065,627, dated December 29, 1936, Serial No. 660,525, March 13, 1933. Application for reissue February 18, 1938, Serial No. 191,274

8 Claims. (Cl. 148—21)

The invention relates to heat treating processes and torches therefor, and more particularly to processes of and blow torches adapted for heat treating a certain portion or portions only of a metal body.

It has been proposed to heat treat portions of articles by means of a torch, such as the ordinary oxyacetylene torch, by playing the flame upon the portion to be heat treated for the required length of time, and then quickly chilling the said portion as by quenching.

In order to prevent any material heating of adjacent portions of the article, resulting in the setting up of strains therein and/or changes in the grain structure thereof, it is customary to play streams of water or other cooling medium around or at the sides of the portion being heated by the flame.

This practice requires the services of one or more men in addition to the torch operator. Moreover, it is obviously very difficult continuously to direct the cooling medium onto the article being heat treated with sufficient accuracy so that the cooling medium does not strike the portion being heat treated and is not directed onto portions too greatly removed therefrom.

Consequently, non-uniform or uneven heating of the portion to be treated is very apt to occur, and the resulting physical characteristics of the portion heat treated are uncertain and frequently decidedly unsatisfactory.

Accordingly, it is an object of the present invention to provide a torch having an improved burner end construction adapted for heating a desired portion of a metal body and for simultaneously cooling adjoining portions thereof.

Another object is to provide an improved burner end construction for simultaneously applying a cooling medium to an article at a predetermined, substantially constant distance from the portion being heated.

A further object is to provide an improved burner end construction having means for directing cooling medium against the article being heat treated at locations entirely surrounding the portion being heated by the flame.

Another object is to provide an improved burner end construction having means for discharging a cooling medium adjacent to the flame and for cooling the burner tip.

A still further object is to provide a torch having means for conducting a cooling medium to its burner end, and means located adjacent the gas controlling means for independently controlling the flow of cooling medium.

Furthermore, it is an object of the present invention to embody all of the foregoing objectives in a simple, compact and inexpensive construction, which is particularly adapted for efficient and convenient manipulation by a single operator, and which produces work of extremely high quality .

And finally, it is an object of the present invention to provide a process of heat treating in which the torch of this invention is particularly useful.

These and other objects are attained by the improvements comprising the present invention, which may be stated in general terms as including a torch having a burner tip and a handle, means on the handle for controlling the flow of gases to the burner tip, a jacket surrounding the burner tip and forming a jacket chamber, means associated with the handle for introducing a cooling medium to the jacket chamber, means located adjacent the gas controlling means for controlling the flow of cooling medium to the jacket chamber, and the wall of the jacket forming a discharge outlet for the cooling medium adjacent the gas outlet of the burner tip.

Preferred embediments of the present improvements are illustrated in the accompanying drawing, in which.

Similar numerals refer to similar parts throughout the several views.

Figure 1:
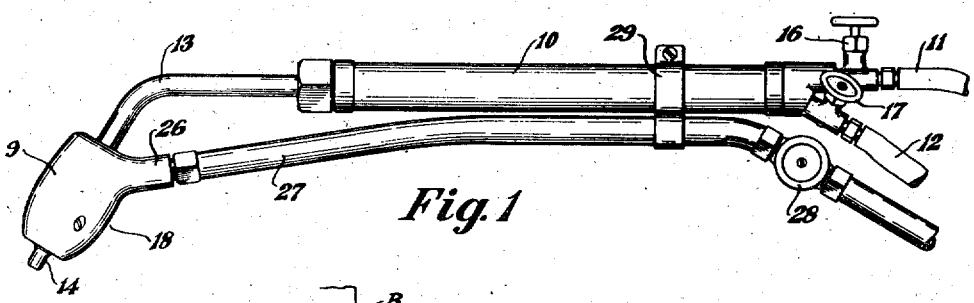
Fig. 1 is an elevational view of a torch embodying the present improvements, and having a preferred form of burner end construction.

A preferred embodiment of the improved torch is shown in Fig. 1, the handle portion 10 thereof being connected at one end to gas supply lines 11 and 12, which may conduct oxygen and acetylene respectively. At its other end, the handle portion 10 is connected to a burner pipe 13, upon the outer end of which is secured a burner tip 14 having a gas discharge outlet 15 at its outer end. The gases supplied by conduits 11 and 12 are conducted through the handle portion to the burner pipe 13 and a mixture of said gases is discharged in the form of a jet at the outlet 15 where it is ignited, all in the usual manner.

A valve 16 is provided for controlling the flow of the gas in supply conduit 11, and a valve 17 is provided for controlling the flow of gas in conduit 12, according to common practice. As shown, the valves 16 and 17 are conveniently located at the inner end of the handle portion 10 for quick and easy manipulation by the operator.

Figure 3:
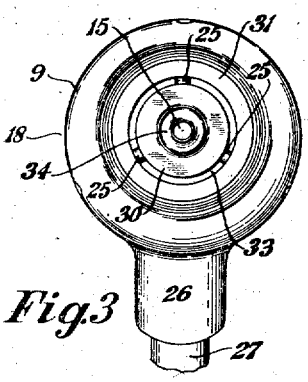
Fig. 3 is an end elevation thereof.
Figure 2:
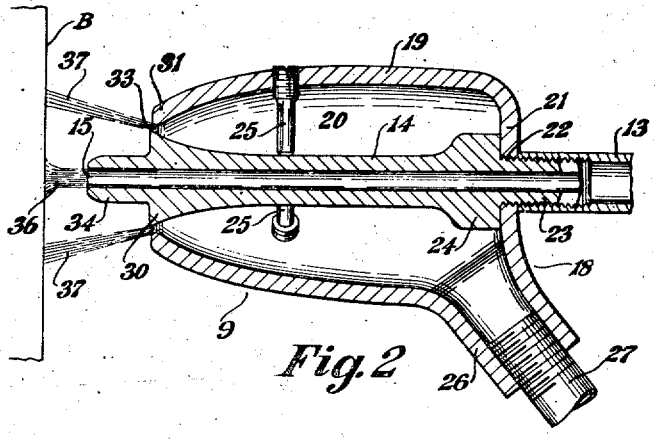
Fig. 2 is a longitudinal section of the burner end shown in Fig. 1.

The improved burner end construction applied to the torch to adapt it for heat treating desired portions only of an article, is indicated generally at 18 in Figs. 1, 2 and 3, and preferably includes a jacket 9, which may be substantially circular in cross section and has an annular wall 19.

The jacket 9 is adapted to engirdle the burner tip 14 and forms a substantially annular jacket chamber 20 between the tip 14 and the wall of the jacket 9. Preferably, the jacket 9 extends longitudinally substantially the entire length of the tip.

The jacket 9 is preferably provided with a rear or end wall 21, which has at its central portion a threaded aperture 22. The tip 14 is provided at its inner end with a threaded projecting end portion 23 for screwing into the burner pipe 13, and the portion 23 is also adapted to screw into the threaded aperture 22 of the end wall 21 of the jacket.

Preferably the tip 14 is provided with a shoulder portion 24 which abuts the inner surface of the end wall 21 of the jacket for mounting the tip solidly therein. Intermediate its ends the annular wall 19 of the jacket may have circumferentially spaced set screws 25 screwed therethrough, for abutting the tip 14. The screws 25 act to center the outer end of the tip 14 within the jacket so that the tip is coaxial with the jacket.

It will be obvious that by adjusting the set screws 25 the jacket and tip may be relatively adjusted so as to position the tip against the jacket at one point or another in order to regulate the discharge of water around the tip, whereby it is possible to discharge water entirely around the gas jet in a uniform jet or cone, or to cut off the flow of water at any desired point so that the operator may observe the metal during the heat treating operation and thus be guided in his work.

With the difference in diameter of the tip and the jacket very slight as shown in Fig. 2, it will be seen that by moving the tip against one side of the jacket, a sufficient portion of the discharge of water will be cut off at that side to permit the operator to view the work clearly through the opening thus produced in the cone of water.

Preferably adjacent its rear wall 21, the jacket 9 is provided with an angularly extending inlet portion 26 which is secured to or may be integral with the walls of the jacket. The inlet portion 26 is preferably interiorly threaded for receiving the threaded end of a conduit 27 for conducting a cooling medium into the jacket chamber 20.

A valve 28 for controlling the flow of cooling medium is provided in the conduit 27 adjacent to the gas valves 16 and 17, for convenient manipulation by the operator of the torch. The valve 28 is preferably maintained in adjacent relation to the valves 16 and 17 by means of a clamp 29 which holds the conduit 27 in close association with the handle portion 10 of the torch.

Adjacent its outer end, the burner tip 14 may be flared outwardly as indicated at 30, and the annular wall 19 of the jacket preferably converges inwardly at its outer end as shown at 31, so that the end 31 of the jacket and the flared portion 30 of the tip are spaced only slightly apart and form an annular discharge outlet 33 extending entirely around the tip 14 for discharging the cooling medium from the jacket chamber 20.

The outer end 34 of the burner tip 14 in which the discharge outlet 15 is located, may project slightly outwardly from the flared portion 30, and is preferably reduced somewhat in diameter from the diameter of the flared portion 30. The annular discharge outlet 33 is laterally spaced from and closely adjacent to the gas discharge outlet 15 of the tip, and the area of the outlet 33 is preferably such that the cooling medium will be discharged under pressure in the form of an annular jet surrounding the jet of gas.

In heat treating a portion of a metal body B, the tip 14 is maintained at a substantially constant distance therefrom and the flame indicated at 36 is played directly upon the portion to be heat treated, and at the same time a cooling medium such as water is being discharged from the outlet 33 as indicated at 37. The cooling medium, accordingly, is discharged from the burner at a slight angle away from and in the form of a cone entirely surrounding the burner flame 36, and impinges upon the work at a substantially constant distance laterally from the portion impinged by the flame of the gas jet, so as to prevent the heat from being conducted to adjoining portions of the body B and preclude the setting up of any strains therein or changes in the grain structure thereof.

Figure 5:
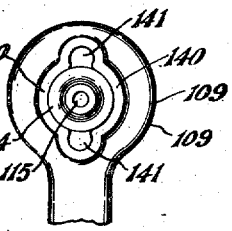
Fig. 5 is an end elevation thereof.
Figure 4:
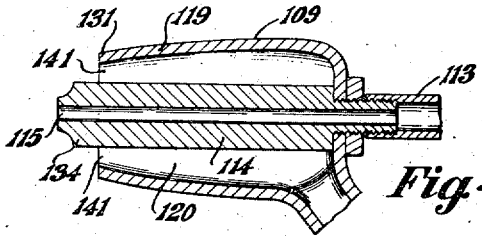
Fig. 4 is a longitudinal section of a modified form of burner end construction.
Figure 7:
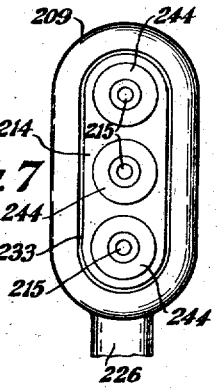
Fig. 7 is an end elevation thereof.

In the modified form shown in Figs. 4 and 5, the burner tip 114 may be cylindrical substantially throughout its length, and has a discharge outlet 115 at its outer end 134, and is connected to the burner pipe 113 at its inner end. The jacket 109 is similar in shape to the jacket 9, except that at the outer end 131 of the jacket, the wall 119 thereof is shaped to fit closely around the tip 114 throughout the major part of its periphery as indicated at 140, and form between the jacket and the tip diametrically opposite discharge apertures 141 for discharging streams of the cooling medium under pressure from the jacket chamber 120, at locations closely adjacent to the gas discharge outlet 115 of the tip 114.

Figure 6:
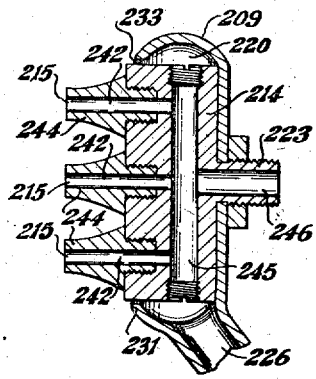
Fig. 6 is a longitudinal section of another modification of burner end construction.

In the modified form shown in Fig. 6, the burner tip 214 is provided with a plurality of gas discharge passages 242 which extend through and form laterally spaced discharge outlets 215 in the burner tip ends 244. The discharge passages 242 communicate with a laterally extending passage 245 in the tip, and the passage 245 in turn communicates with a passage 246 formed in the inner projecting end 223 of the tip, which is adapted for connection to the burner pipe. The jacket 209 engirdles the burner tip 214 and forms a jacket chamber 220 extending entirely around the tip 214.

An inlet portion 226 communicates with the jacket chamber 220 for introducing cooling medium therein. The outer end 231 of the wall 219 of the jacket chamber converges inwardly and is spaced only slightly from the outer surface of the burner tip 214 to form a continuous discharge opening 233 for discharging a jet of the cooling medium extending entirely around the burner tip and laterally closely adjacent to the gas discharge outlets 215.

Figure 8:
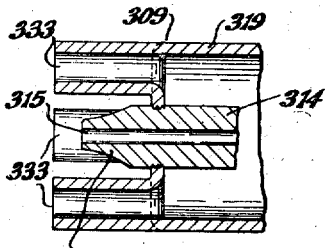
Fig. 8 is a fragmentary longitudinal section of still another modified form of burner end construction.

In the modified form shown in Fig. 8, the wall 319 of the jacket 309 projects outwardly beyond the burner tip end 334, and has formed therein circumferentially spaced discharge outlets 333 for discharging streams of cooling medium at diametrically opposite points laterally closely adjacent to the gas discharge outlet 315 of the tip 314.

In the operation of the improved torch, the gas mixture issuing from the discharge outlet of the tip is first ignited. The burner tip end is then held closely adjacent to and at a substantially constant distance from a metal body, such as indicated at B in Fig. 2, with the flame 36 impinging directly upon the portion of the body to be heat treated. The valve 28 is then opened to introduce cooling medium into the jacket chamber, and the cooling medium is forced out of the discharge outlet or outlets under pressure, striking adjacent portions of the body B at predetermined distances from the portion impinged by the flame. In all forms of the invention herein disclosed, the cooling medium is discharged onto the work at points adjacent the portion of the work impinged by the flame or jet of gas.

Thus the portions of the body B adjacent to the portion being heated by the flame are continuously cooled by the cooling medium during the heating operation, and the cooling medium strikes the body B only at predetermined distances from the flame, thereby preventing internal disturbances in the grain structure of said adjacent portions, and precluding any possibility of the cooling medium striking the portion being heated.

After the portion being heat treated has been heated sufficiently, the flame may be extinguished, and by moving the burner end slightly laterally the cooling medium is directed upon the heated portion to chill or quench the same for proper hardening.

In cases where adjacent portions of a body are being successively heat treated, as for instance gear teeth on a gear wheel, it may not be necessary to extinguish the flame between operations, because when the flame is moved to the next adjacent tooth the cooling medium will strike the tooth just previously heated, quenching the same.

The improved burner end construction provides for discharging a cooling medium adjacent to the flame as above described, and at the same time the jacket chamber containing the cooling medium provides for continuously cooling the burner tip so as to increase the longevity thereof.

The present improved torch is simple and inexpensive, and may be efficiently manipulated by a single operator to produce more uniform results and a higher quality of heat treatment than has been heretofore accomplished.

I claim:

1. Burner end construction for heat treating torches, including a tip having a gas discharge outlet at one end for discharging a jet of gas, a jacket engirdling the tip and forming a jacket chamber between the tip and jacket, means for introducing water into the jacket chamber, and the walls of the jacket at one end thereof being spaced from the tip to form a discharge outlet for the water between the tip and jacket and forming a flared jet of water extending entirely around the gas jet and spaced therefrom, and means for relatively adjusting the jacket and tip to regulate said jet of water at different points around the tip.

2. Burner and construction for heat treating torches, including a tip having a gas discharge outlet at one end for discharging a jet of gas axially of the tip, a jacket engirdling the tip and forming a jacket chamber between the tip and jacket, means for introducing water into the jacket chamber, and the walls of the jacket at one end thereof being spaced from the tip to form an annular discharge outlet for discharging an annular outwardly flared jet of the water around the gas jet and means for relatively adjusting the jacket and tip to regulate said jet of water at different points around the tip.

3. A heat treating torch including a tip adapted for discharging a jet of gas onto a portion of a piece of work maintained at a substantially constant distance from said tip, walls forming a jacket chamber surrounding the tip, means for introducing water into the jacket chamber, and the walls of the jacket chamber forming an outlet for discharging water onto said piece of work at a substantially constant distance laterally from the portion impinged by the jet of gas, and means for shutting off the flow of water at one point around the tip.

4. A heat treating torch including a tip adapted for discharging a jet of gas onto a portion of a piece of work, walls forming a jacket chamber surrounding the tip, means for introducing water into the jacket chamber, and means for discharging the water onto the work at a point spaced from the portion impinged by the gas jet, and means for regulating the discharge of water at different points around the tip.

5. A heat treating torch including a tip adapted for discharging a jet of gas onto a portion of a piece of work, walls forming a jacket chamber surrounding the tip, means for introducing water into the jacket chamber, and means for discharging the water in a cone surrounding and spaced from the gas jet onto the work at a distance from the portion impinged by the gas jet, and means for regulating the cone of water at different points around the tip.

6. A heat treating torch comprising a burner end having a cooling chamber and a passage adjacent thereto having an outlet for discharging a jet of heating gas against a portion of a piece of work; means for supplying a combustible mixture of gases to said discharge passage; means for supplying water to said cooling chamber; and means for discharging, from said burner end through an outlet closely adjacent the outlet through which the jet of heating gas is discharged, such cooling water as a cooling jet directed at an angle away from said heating jet and against the work at a point spaced from the portion against which the jet of heating gas is discharged.

7. A method of hardening metal objects which comprises impinging a heating jet of high intensity upon the portion of the object to be heated, simultaneously impinging a quenching jet upon the object in the form of a sheath substantially surrounding and in close proximity to the impingement of the heating jet, and effecting relative and progressive movement between the jets as a unit and the object.

8. A method of hardening metal objects which comprises directing a heating jet of high intensity from a burner end against a portion of the object to be heated; continuously supplying a cooling medium to said burner end and passing such cooling medium through said burner end so as to prevent overheating of the same; continuously directing said cooling medium as a cooling jet discharged from said burner end through an outlet closely adjacent the outlet through which the heating jet is discharged and against a portion of the object closely adjacent the portion against which said heating jet is directed, said cooling jet being directed at a slight angle away from said heating jet and normally impinging upon at least a portion of the object previously heated; and effecting a relative movement between said burner end and said object to apply said heating jet and said cooling jet concurrently to successive portions of said object.

CHARLES H. TAYLOR.